UNITED STATES PATENT OFFICE 2,168,185

METHOD OF WELDING

Peter Popow Alexander, Marblehead, Mass., assignor to Metal Hydrides Inc., Clifton, Mass., a corporation of Massachusetts No Drawing. Application September 25, 1936, Serial No. 102,556. Renewed December 30, 1938

4 Claims. (Cl. 113—112)

This invention relates to the production and use of titanium hydride.

The object of this invention is to provide the means of supplying hydrogen and titanium in pure active form by the thermal dissociation of titanium hydride.

Another object of this invention is to provide a flux containing a sufficient amount of titanium hydride.

A third object of this invention is to provide a flux capable of removing nitrogen from metals or gaseous mixtures.

Hydrogen gas at the present time is stored only in compressed state in specially built heavy steel cylinders. The art of storage of hydrogen in compressed state is well developed, but such means of storage are costly. It involves large investments in special compressors and heavy steel tanks. A more efficient method for the storage of hydrogen would be to cause it to combine with a suitable metal and to form a hydride. Out of a number of known hydrides none are suitable for such a purpose either on account of their chemical instability or because of a very high price. I found that specially prepared titanium metal which is quite abundant in nature can be used for this purpose.

Under ordinary conditions titanium, as is the case with most of the other metals, adsorbs a certain amount of hydrogen, but does not form a hydride which can be represented by the formula $TiH_2$.

I found however that if titanium oxide is reduced with calcium hydride, United States Patent 2,038,402, and the produced powdered metal is cooled in hydrogen the product is not metallic titanium but titanium hydride answering the formula of $TiH_2$.

This hydride resembles in its properties the well known zirconium hydride which is represented by the formula $ZrH_2$. Titanium hydride is a brittle solid, quite stable at room temperature. It is not hygroscopic and is fairly resistant to the attack of dilute acids. I found that when heated in air to about 350° C. it decomposes slowly with the evolution of hydrogen gas. If the temperature is raised to that of the ignition of hydrogen, the evolving hydrogen ignites and burns with a quiet flame completely surrounding the slowly decomposing hydride. As soon as all the hydrogen evolving from this compound is consumed the remaining substantially pure titanium then ignites and burns in a fraction of a second with a sudden evolution of very large quantities of heat. The temperature of burning titanium then rises instantly to that of dazzling white heat.

If the powdered titanium hydride prepared by my method is heated in a closed quartz vessel filled with pure hydrogen at normal atmospheric pressure, the decomposition begins at about 350° C. With the elevation of temperature the rate of evolution of hydrogen increases, reaching a maximum at 800° C. The remaining titanium powder sinters together at 1000° C. producing an ingot of silver white metal which is very hard and easily scratches glass.

I found that every gram of titanium hydride when heated gradually to 900° C. evolves 360 cubic centimeters of hydrogen. The remaining titanium still contains hydrogen which is held in occluded form and can be extracted at higher temperatures or by treatment in vacuum. The total volume of hydrogen extracted when the hydride was treated in vacuum at 1100° C. was found to be 398 cc.

The above described properties of titanium hydride prepared by my method provide the means of storage of a large volume of hydrogen in a combined form which can be released by heating this compound to a suitable temperature. This property of titanium hydride of dissociation at temperatures of red heat, is utilized by me in the treatment of metals. The products of dissociation of titanium hydride are nascent hydrogen and nascent titanium. These two elements in the above active form are the most efficient agents for the removal of nitrogen and oxygen from metals or gaseous mixtures.

For the purpose of producing better welds, for instance, by the arc welding process I am using titanium hydride as a flux either in pure state or as an active ingredient of other standard fluxes already used in the art.

When pure iron or steel is melted in the electric arc furnace or fused as an electrode in the electric arc welding process or by the oxy-acetylene torch, the produced metal is usually contaminated with oxygen and nitrogen which are found in the resulting metal in the form of iron oxide and iron nitride. The contamination is especially pronounced in the case of the arc welding process.

The contamination of iron with oxygen can be effectively prevented by the use of slags, fluxes or deoxidizers or by surrounding the iron with a neutral or reducing gaseous atmosphere. But the contamination with nitrogen can not be prevented with the same efficacy. The percentage of nitrogen in the air is four times greater than that of oxygen. It does not combine with the usual fluxes or reducing gases and therefore can infilter and reach the molten metal much easier than oxygen. Furthermore once the nitride of iron has formed, no flux or gaseous medium available at present would completely remove it. It is known that metallic titanium combines readily with nitrogen of the air. It is claimed also that an addition of ferro-titanium alloy would reduce the percentages of combined nitrogen in steel.

In the case of the arc welding operation, for example, the time of treatment of the rapidly solidifying metal is so short that the titanium must be in a very active form to produce the desired results.

Titanium should be added as a flux in a substantially pure state, preferably in the form of a fine powder. The difficulty in doing this is due to the fact that finely powdered titanium at the temperature of dull red heat ignites and burns instantly into a mixture of titanium oxide and titanium nitride before it reaches the weld. To produce a beneficial effect on the metal under treatment, it is necessary to slow down the above reaction without detracting any effectiveness from the action on nitrogen in the surrounding air or on the already formed nitride of iron.

To produce such results I am using not a pure metallic titanium but titanium hydride, a compound of titanium and hydrogen represented by the formula $TiH_2$.

The titanium hydride in the form of a fine powder is mixed with a sufficient amount of other fluxes, such as calcium oxide, calcined borax or other standard fluxes used as the carriers for the active part of my flux.

When such a flux is supplied to the hot zone of the weld every particle of titanium hydride begins to evolve hydrogen which completely surrounds it. This atmosphere of hydrogen protects the particles from rapid combustion and allows them to come in contact with weld metal before their active properties are destroyed. However, after coming in contact with molten metal the particles of titanium hydride are instantly dissociated, releasing nascent hydrogen and nascent titanium. Their affinity for oxygen and nitrogen are so great that all the iron oxides and iron nitrides are reduced, forming titanium oxide and titanium nitride and a certain amount of steam.

When titanium hydride is used in the production of pure metals and alloys the operations, of course, are on a larger scale but the action of the produced nascent titanium and nascent hydrogen are substantially the same as in welding processes.

Modifications of my method of the preparation and use of titanium hydride may be apparent to those skilled in the art but they are contemplated by me as forming a part of my invention.

What I claim as new and desire to secure by Letters Patent of the United States, is:

1. That improvement in the art of welding iron which comprises fusing the metal at the point of the weld and dissociating titanium hydride in the zone of the weld by the application of heat to evolve nascent hydrogen and nascent titanium in the molten metal.

2. That improvement in the art of welding iron which comprises fusing the metal at the point of the weld and deoxidizing and denitrogenizing the molten metal by applying titanium hydride thereto.

3. That improvement in the art of welding iron which comprises fusing the metal at the point of the weld in the presence of titanium hydride and calcium oxide.

4. That improvement in the art of deoxidizing and denitrogenizing iron which comprises raising the temperature of iron to the melting point and introducing titanium hydride into the molten metal to reduce the iron oxides and iron nitrides to substantially pure iron with the accompanying formation of titanium oxide and titanium nitride.

PETER P. ALEXANDER.